US007962607B1

(12) United States Patent
Chang et al.

(10) Patent No.: US 7,962,607 B1
(45) Date of Patent: Jun. 14, 2011

(54) GENERATING AN OPERATIONAL DEFINITION OF BASELINE FOR MONITORING NETWORK TRAFFIC DATA

(75) Inventors: Hung-Jen Chang, Fremont, CA (US); Mohan Kumar Maturi, San Jose, CA (US)

(73) Assignee: Network General Technology, Grand Cayman (KY)

( * ) Notice: Subject to any disclaimer, the term of this patent is extended or adjusted under 35 U.S.C. 154(b) by 589 days.

(21) Appl. No.: 11/518,015

(22) Filed: Sep. 8, 2006

(51) Int. Cl.
*G06F 15/173* (2006.01)
*G06F 13/00* (2006.01)
(52) U.S. Cl. ......... 709/224; 711/123; 711/125; 711/126
(58) Field of Classification Search .............. 709/223, 709/224; 707/101, 102; 711/123, 125, 126
See application file for complete search history.

(56) References Cited

U.S. PATENT DOCUMENTS

| 5,757,751 | A | * | 5/1998 | Chapman | 369/53.33 |
| 5,907,639 | A | * | 5/1999 | Kim | 382/242 |
| 6,836,800 | B1 | * | 12/2004 | Sweet et al. | 709/224 |
| 7,406,436 | B1 | * | 7/2008 | Reisman | 705/10 |
| 2006/0020924 | A1 | * | 1/2006 | Lo et al. | 717/127 |
| 2006/0059392 | A1 | * | 3/2006 | Kizer et al. | 714/704 |
| 2007/0091997 | A1 | * | 4/2007 | Fogg et al. | 375/240.1 |

OTHER PUBLICATIONS

Barnett, V. et al., *Outliers Statistical Data*, Third Edition, Oct. 1994, pp. 464-526, John Wiley & Sons.
Feather, F. et al., "Fault Detection in an Ethernet Network Using Anomaly Signature Matching," SIGCOMM '93, Sep. 1993, pp. 279-288.
Lupton, R., *Statistics in Theory and Practice*, 1993, pp. 30-80, Princeton University Press, Princeton, N.J.

* cited by examiner

*Primary Examiner* — Ranodhi N Serrao
*Assistant Examiner* — Farrukh Hussain
(74) *Attorney, Agent, or Firm* — Fenwick & West LLP

(57) ABSTRACT

A system and a method are disclosed for establishing a baseline and the corresponding bands of data for alarming, etc. Historical raw data are aggregated and grouped. For example, the data may be and hourly grouped as 168 groups of data in a weekly frame. Clusters of the groups of data are then formed based on dynamic data window by analyzing statistical similarity among the 168 groups of data. Data in each cluster of groups, originated from the raw data at specific hour(s) of day on specific day(s) of week, are used as historical data to predict a baseline and the envelopes at these associated hour (s) and day(s). Generating a baseline includes determining a mapping function, which transforms data in a cluster to become normal or nearly normal. A mean and standard deviation of the transformed data are calculated. Envelopes are determined using the mean and the standard deviation. An inverse transformation function is uniquely derived. The mean and the envelopes are inversely transformed using the inverse function. This operationally decides a baseline and the corresponding bands for every weekly time frame hour.

24 Claims, 9 Drawing Sheets

| TIME | M | T | W | Th | F | Sa | Su |
|---|---|---|---|---|---|---|---|
| 12:00 AM – 1:00 AM | 32 | 32 | 32 | 32 | 32 | 32 | 32 |
| 1:00 AM – 2:00 AM | 32 | 32 | 32 | 32 | 32 | 32 | 32 |
| | | | | | | | |
| | | | | | | | |
| | | | | | | | |
| | | | | | | | |
| | | | | | | | |
| | | | | | | | |
| 11:00 PM – 12 AM | 32 | 32 | 32 | 32 | 32 | 32 | 32 |

FIGURE 3

GENERATING AN OPERATIONAL DEFINITION OF BASELINE FOR MONITORING NETWORK TRAFFIC DATA

BACKGROUND

1. Field of Art

The present invention relates generally to the field of network and application management of computer networks, and, more specifically, to the field of monitoring networks.

2. Description of the Related Art

Today's computer networks are extremely complex with hundreds of applications, thousands of servers, hundreds of locations, hundreds of thousands of clients and traffic routed by numerous switches and routers on local area networks (LANs) and wide area networks (WANs). Detection of network faults and performance problems become very critical to have an efficient working environment. However, it also becomes very difficult because there is no commonly accepted operational definition of the baseline of a given measure.

A conventional moving average is often used as a baseline. In this approach, a baseline value is an arithmetic average of measured values within a fixed time window. Since baselining is to show a relatively short term behavior, the number of data set inside the window is small and the data distribution usually has a very large variance. The arithmetic average is not a good estimate of the expected value (or mathematical expectation) of a measure, which is also called the population mean. In other words, the baseline value obtained by using this sample mean can be very misleading (e.g., inaccurate), and an inner band and outer band based on the sample mean and sample variance may become meaningless due to an unknown sample data distribution with a large variance of the network traffic measure.

From the above, there is a need for a system and process to provide a baseline that handles a large variance in a data distribution with a limited number of samples.

SUMMARY

A system and a method are disclosed for establishing a baseline and the corresponding bands of data for alarming. Historical raw data are aggregated and grouped. For example, the data may be hourly grouped as 168 groups of data in a weekly frame. Clusters of the groups of data are then formed based on dynamic data window by analyzing statistical similarity among the 168 groups of data. Data in each cluster of groups, originated from the raw data at specific hour(s) of day on specific day(s) of week, are used as historical data to predict a baseline and the envelopes at these associated hour(s) and day(s). Generating a baseline includes determining a mapping function, which transforms data in a cluster to become normal or nearly normal. A mean and standard deviation of the transformed data are calculated. Envelopes are determined using the mean and the standard deviation. An inverse transformation function is uniquely derived. The mean and the envelopes are inversely transformed using the inverse function. This operationally decides a baseline and the corresponding bands for every weekly time frame hour.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 3 is a table illustrating data prepared for analysis from the extracted data of FIG. 2.

DETAILED DESCRIPTION

Figure 1:
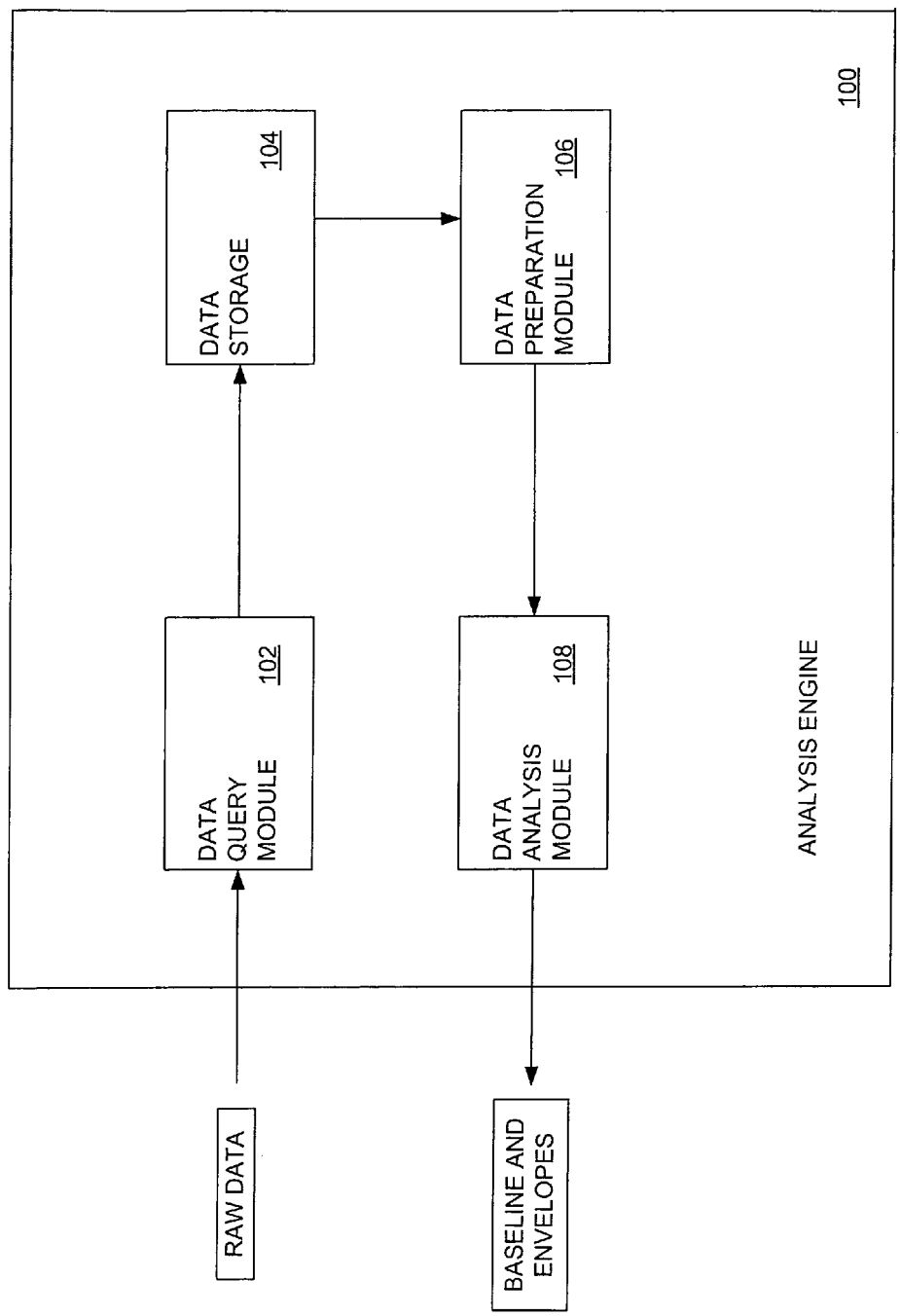
FIG. 1 is a block diagram illustrating an analysis engine according to the present invention.

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Generally, the disclosed embodiments describe a system and method for operationally defining a baseline of the network traffic data and the associated inner and outer bands.

The baseline of a measure (e.g., total bytes, utilizations, conversations, errors, or the like) may be a function of time (e.g., hour of day, day of week, or the like.) and entities (e.g., interface, server, application, subnet, or the like). By collecting and aggregating data as such, the baseline and the associated bands are obtained for a given measure. To optimize the accuracy of a baseline prediction, two procedures may be used during run time.

1. A dynamic data window is determined based on all distributions of hourly-grouped data sets, so that groups are further clustered to include a larger number of samples. (A sufficient number of samples provides better statistical analysis.)
2. A data transformation function is determined based on the input historical data, so that the transformed data become normal or nearly normal and the sample mean from computation is used to estimate the population mean for predicting the baseline. (For the case of a normal distribution, no unbiased estimator of the population mean has a smaller variance than its sample mean.)

Because the sample mean most closely estimates the population mean for a normally distributed data set, the baselines of various network traffic measures from the prediction based on the transformed data can provide a more convincing indication for judging network performance. The actual data, baseline and associated bands of any selected measure may be dependent on given network critical entities for a fixed time interval. Superimposition of these values on a chart easily presents the behavior of a network traffic behavior to a user. The user may tune the band level parameters based on the standard deviation of a normal distribution, and monitor the changing of alert status on the same traffic data.

FIG. 1 is a block diagram illustrating an analysis engine 100 according to the present invention. The analysis engine 100 may receive data from a plurality of sources. In one embodiment, the sources are databases at data servers. The data have at least two characteristics, namely key and measures. The key is an abstraction of a physical entity that is the source of the data. The measure is an abstraction of the form and size of the data. The measure may be, for example, packets or bytes. A key may have one or more measures. Each measure has a value. The data may be gathered at a different rate than the granularity used for the baselining. In one embodiment, the analysis engine 100 groups the data hourly in a weekly time frame and determines a window dynamically for clustering among these groups. The analysis engine 100 generates a baseline point and the corresponding bands based on the data in each cluster.

The analysis engine 100 comprises a data query module 102, a data storage module 104, a data preparation module 106, and a data analysis module 108. From data sources, the data query module 102 may extract, filter, group and order the data based on preset criteria (e.g., analysis type, interface, number of entities, time period, or the like), and cache them to the data storage 104. (In one embodiment, the criteria setting matches the extracted data volume with the storage capacity.) In one embodiment, the data storage 104 caches the data in its received and derived form for the data preparation module 106. After the baseline prediction is done by analyzing these data, the analysis engine 100 frees the storage space and starts extracting data again, and repeats the process until all enabled entities for baselining are finished. The analysis engine 100 may comprise a conventional computer including a processor that executes the data query module 102, the data preparation module 106 and the data analysis module 108, and includes a memory for the data storage 104.

Figure 2:
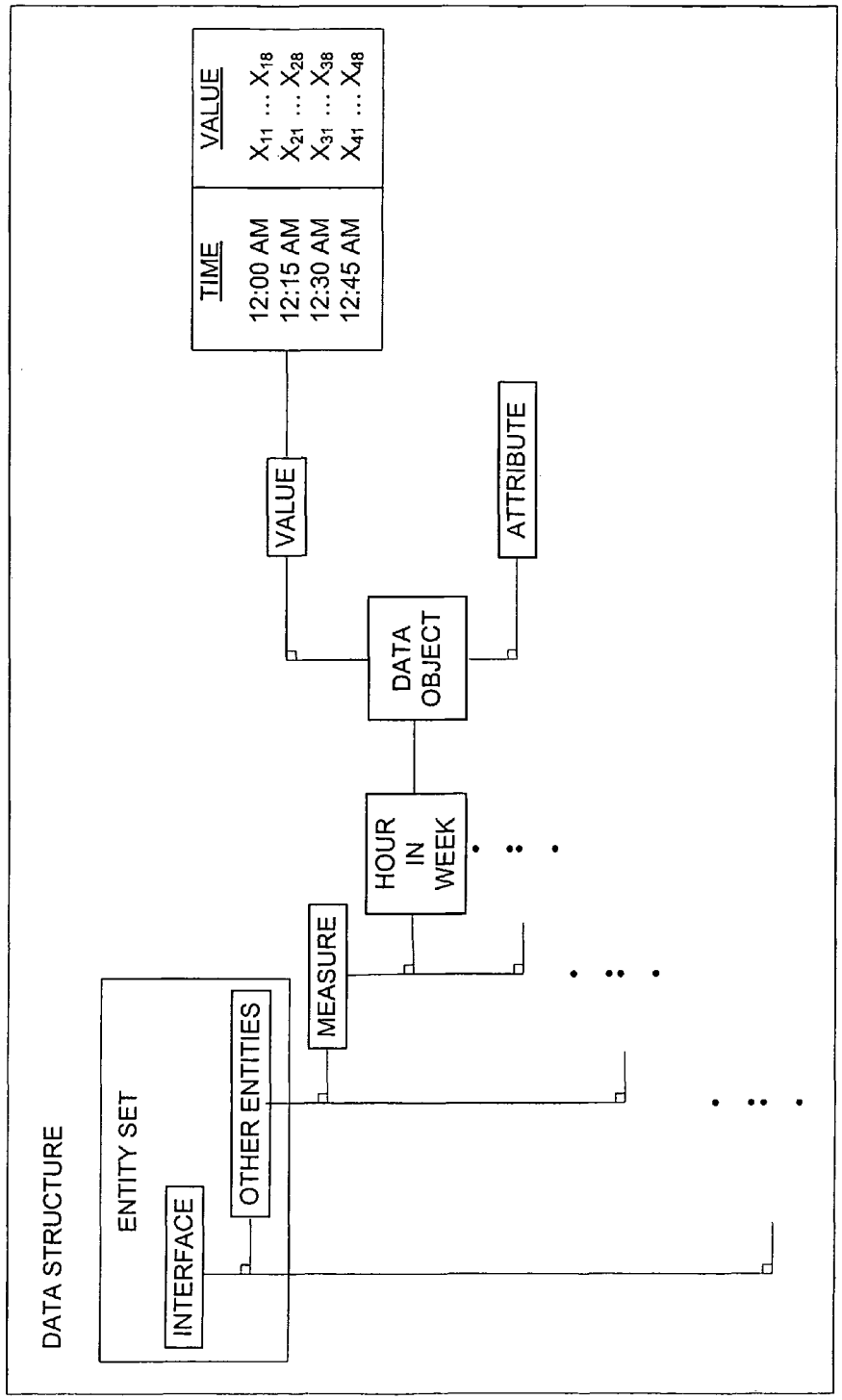
FIG. 2 is a diagram illustrating a data structure for caching per 15-minutes data in the analysis engine of FIG. 1.

FIG. 2 is a diagram illustrating data cached in the data storage 104. Given an interface, which has the other entities such as server, application, subnet, or the like, extracted data for all the associated measures of the entity sets are cached. Each measure includes 168 hourly-grouped data objects in a weekly time frame. Each data object has a value matrix, and the data attributes which are derived when executing the data query module 102. As an illustrative embodiment, raw data are extracted, aggregated, and stored in 15-minutes intervals. (For some analysis type, one-minute intervals are used.)

Referring again to FIG. 1, the data query module 102 extracts, groups and orders raw data into groups based on time, such as one hour increments in a weekly time frame. The data storage 104 caches data for the purpose of efficient data access. The data preparation module 106 clusters the groups of data based on statistical similarity of the groups.

FIG. 3 is a table illustrating clusters from the groups of data of FIG. 2. The number "32" in a cell indicates the number of data points in an hourly group. The number "32" is a configurable number and dependent on the availability and suitability of historical raw data. (Raw data may be too old to use if the number is large. In one embodiment, baselining is for studying a relatively short-term behavior.) Clustering is based on similarity of the distribution of the data values in each group. For example, the group for Monday, 12:00 a.m.-1:00 a.m. is clustered with the group for the following hour Monday, 1:00 a.m.-2:00 a.m. The data for 12:00 a.m.-1:00 a.m. on Wednesday, Thursday, and Friday are grouped as a cluster.

Referring again to FIG. 1, the data analysis module 108 transforms the data in each cluster using the data transformation function determined by the data in the cluster from the data preparation module 106 as described below in conjunction with FIG. 5.

The data transformation function is determined through a learning process (e.g., by way of feedback control) based on the input data of a cluster from the data preparation module 106, so that after the transformation the cluster of data has a normal or nearly normal distribution, and thereby the population mean can be well estimated by the sample mean. (For the case of a normal distribution, no unbiased estimator of the population mean has a smaller variance than its sample mean.)

The data analysis module 108 determines a transformation function, transforms the data from the data preparation module 106, remove outliers, calculates a mean and standard deviation of the transformed data, and calculates envelopes using the mean and standard deviation. The data analysis module 108 also derives the corresponding inverse transformation function and transforms the mean and envelopes back into the original data space. The inversely transformed mean and the envelopes are used to form a baseline and the corresponding bands.

The envelopes may be used as thresholds to create alarms, alerts, violations, or the like. For example, the occurrence of data falling outside the outermost envelopes may trigger a violation, and the occurrence of data falling outside an inner envelope but within the outside envelope (e.g., inside the outer bands) may trigger an alert.

Figure 4:
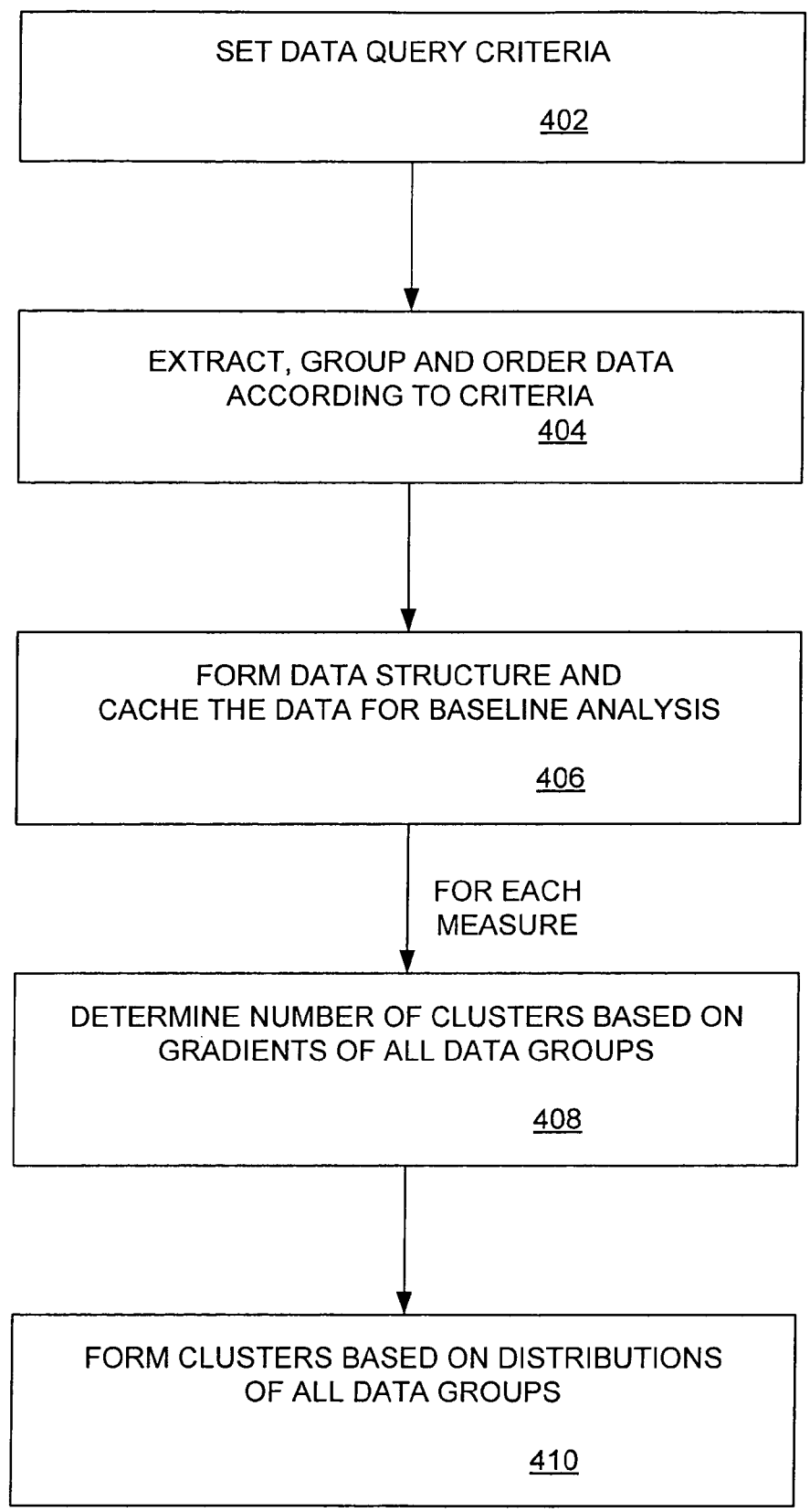
FIG. 4 is a flowchart illustrating one embodiment of the methodology of a data query module, a data storage module, and a data preparation module of the analysis engine of FIG. 1.

FIG. 4 is a flowchart illustrating one embodiment of the methodology of the data query module 102, the data storage module 104 and the data preparation module 106 of FIG. 1. The data analysis module 108 then starts the baseline prediction based on the prepared data.

Instead of using a static moving window, the data analysis engine 100 uses a dynamic moving window for grouping and clustering the data. The data query module 102 determines 402 query criteria including granularity of data grouping, and extracts, groups and orders data 404 based on the criteria. For example, given a fixed entity set, the data query module 102 groups the aggregated data of a measure by hour of day and day of week, and forms n data groups (e.g., n=168=24×7) and the data storage 104 caches them together with the derived properties in the form of the data structure 406 as shown in FIG. 2. The data preparation module 106 determines the number of clusters 408 based on the changing of gradients of the ordered data groups. The data preparation module 106 forms m (<=n) clusters 410 by further clustering the data groups with relatively close statistical characters. For example, hour h1 of day d1, hour h2 of day d2, and so forth may have similar network traffic behavior. One embodiment of the formation of clusters 410 is described below in conjunction with FIG. 5. The collected data are combined in a cluster for one baseline prediction.

Figure 5:
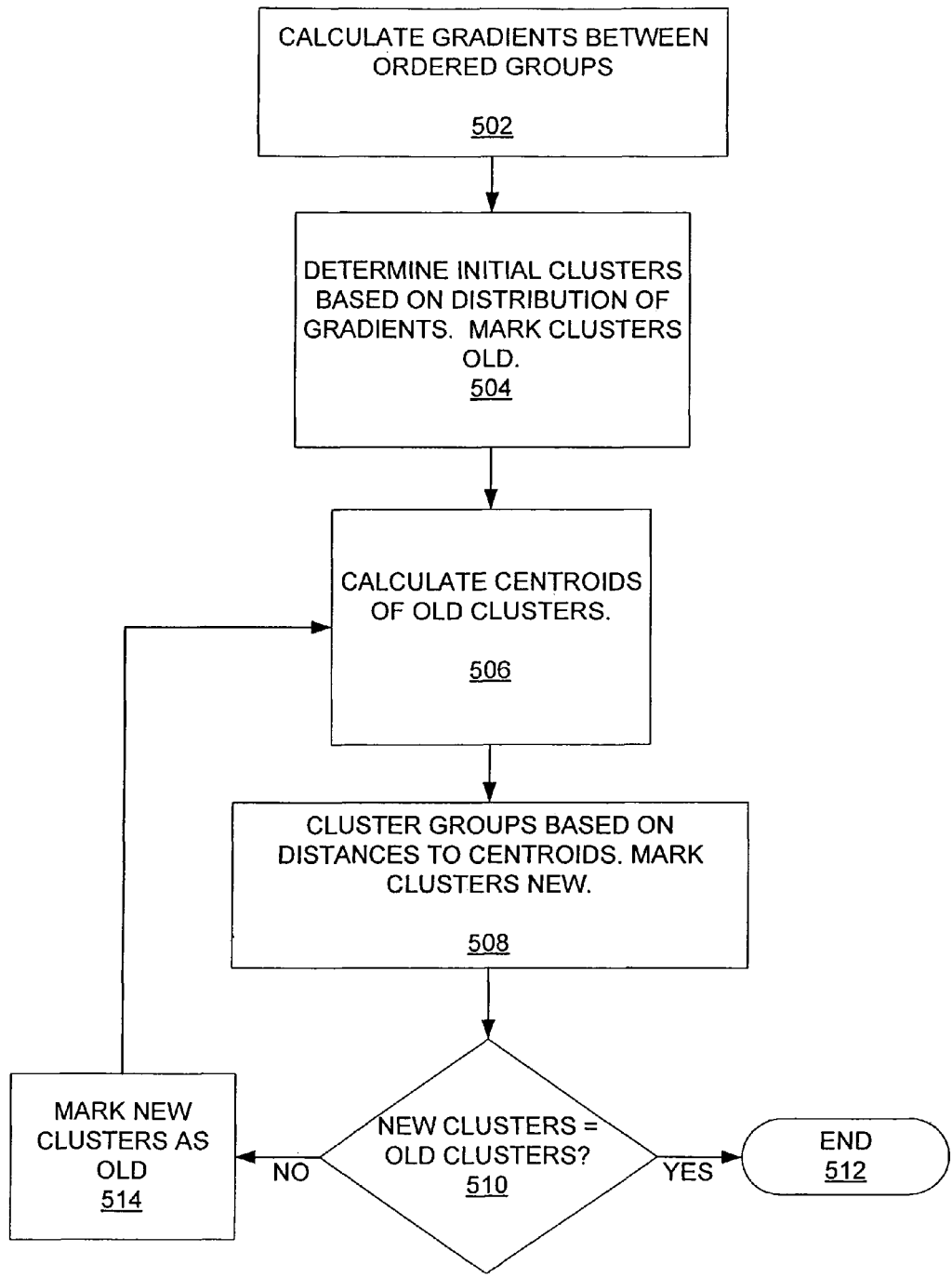
FIG. 5 is a flowchart illustrating one embodiment of the methodology of forming clusters of the methodology of FIG. 4.

FIG. 5 is a flowchart illustrating one embodiment of the methodology of determining 408 number of clusters and forming 410 clusters of the methodologies of FIG. 4.

The data preparation module 106 calculates 502 gradients between ordered groups of data. The data preparation module 106 determines 504 initial clusters of groups based on the statistical analysis of gradients, and marks the initial group of clusters as "old". The data preparation module 106 calculates 506 centroids of all clusters marked "old". The data preparation module 106 clusters 508 groups based on the distances to the centroids, and marks the clusters as "new". The data preparation module 106 determines 510 whether the clusters marked as "new" are the same as the cluster marked as "old". If not, the data preparation module 106 marks 514 the "new" clusters as "old", and calculates 506 centroids of the old clusters as described. Otherwise, if the clusters marked as "new" are the same as the cluster marked as "old", the forming clusters process ends 512.

Figure 6:
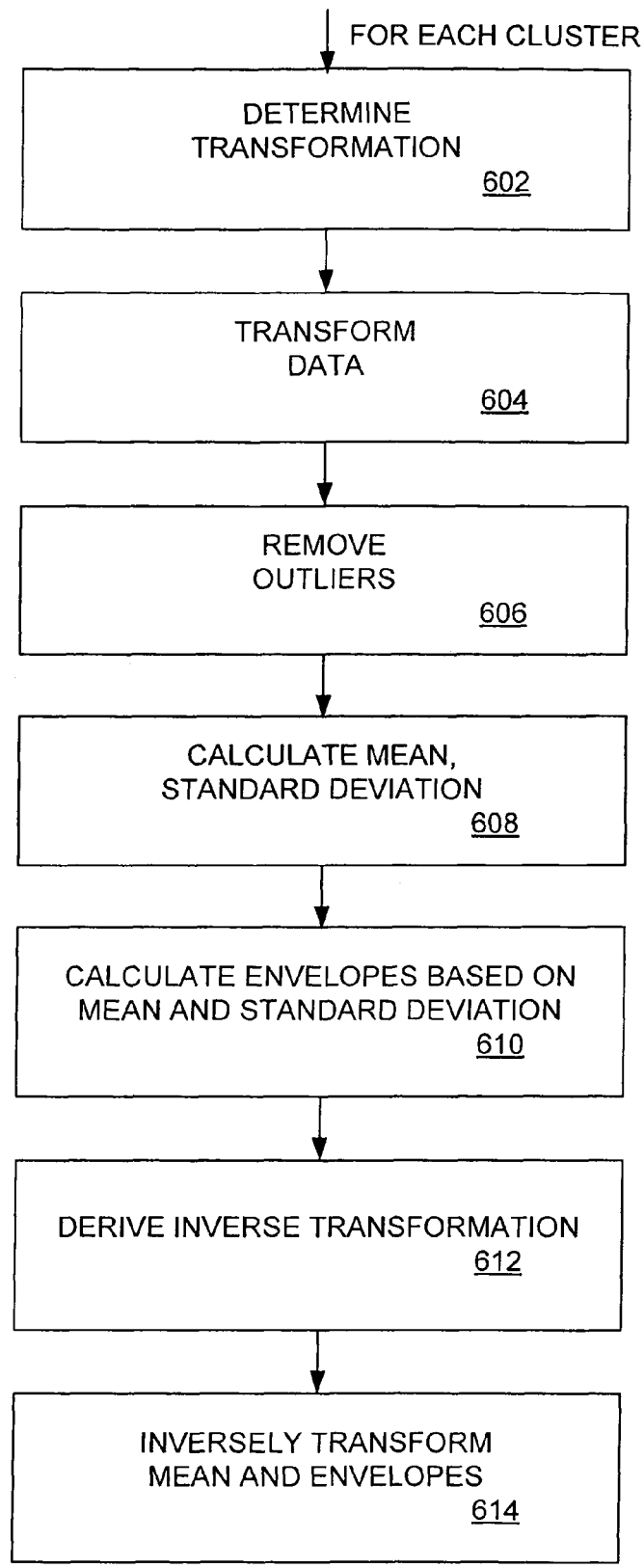
FIG. 6 is a flowchart illustrating one embodiment of the methodology of a data analysis module of the analysis engine of FIG. 1.

FIG. 6 is a flowchart illustrating one embodiment of the methodology of the data analysis module 108 of the analysis engine 100.

The data analysis module 108 determines a transformation function 602 that maps a data set one-to-one into another data set 604. In one embodiment, the transformation function is achieved through a learning process so that the mapping makes the transformed data in a cluster normal or nearly normal. One embodiment of the determination of the transformation function 602 is described below in conjunction with FIG. 7. The data analysis module 108 removes 606 outlier data in each cluster. An outlier is defined as the edge value which is statistically far away from its closest neighbor and from the mean value. The criteria for "statistically far away" are dependent on the number of sample data and the data distribution. The data analysis module 108 removes the outlier(s) when a datum/data fall(s) into the criteria. The data analysis module 108 forms a new cluster with the outlier(s) removed, and repeats the process until no more outlier is detected. The data analysis module 108 calculates 608 the mean and standard deviation of the transformed data (less the outlier data), and calculates 610 envelopes based on the calculated mean and standard deviation. In one embodiment, the data analysis module 108 calculates the envelopes by using the mean plus/minus some predefined multipliers times the standard deviation. In one embodiment, the envelopes are calculated based on 2.0 to 4.0 standard deviations.

The data analysis module 108 derives 612 the inverse transformation function to map the data back into the original data space as described below in conjunction with FIG. 8. Using the inverse transformation, the data analysis module 108 inversely transforms 614 the mean and envelopes back into the original data space. The data analysis module 108 repeats the methodology of FIG. 6 until all clusters for the measures with the given entities are calculated. The data analysis module 108 outputs a baseline and the corresponding bands that may be presented as a graph such as shown in FIG. 9.

The data analysis module 108 involves the processes of clustering 410 more data, transforming 604 data, calculating 608/610 mean and envelopes, and inversely transforming 612/614 mean and envelopes. In one embodiment, these manipulation steps increase the predictability of baseline values, because 1. the expectation value (, which is also called the population mean), which is a good definition of the baseline, is unobtainable accurately from a limited number of data set.
2. the sample mean can be treated as a population mean with the smallest error, if the data distribution is normal.
3. By knowing the number of data points and the distribution, the outlier criteria can be quantitatively described.
4. By using the obtainable sample mean as the estimator of the expectation value of the transformed data set, the baseline is defined as the inverse transformation of the sample mean.

The methodology of FIG. 4 is repeated for changing query criteria until all desired data are extracted and processed. The methodology of FIG. 5 is for each given measure with certain critical entities in data storage from FIG. 4.

The methodology of FIG. 6 is repeated for each cluster until the data of all measures from FIG. 4 are processed.

Figure 7:
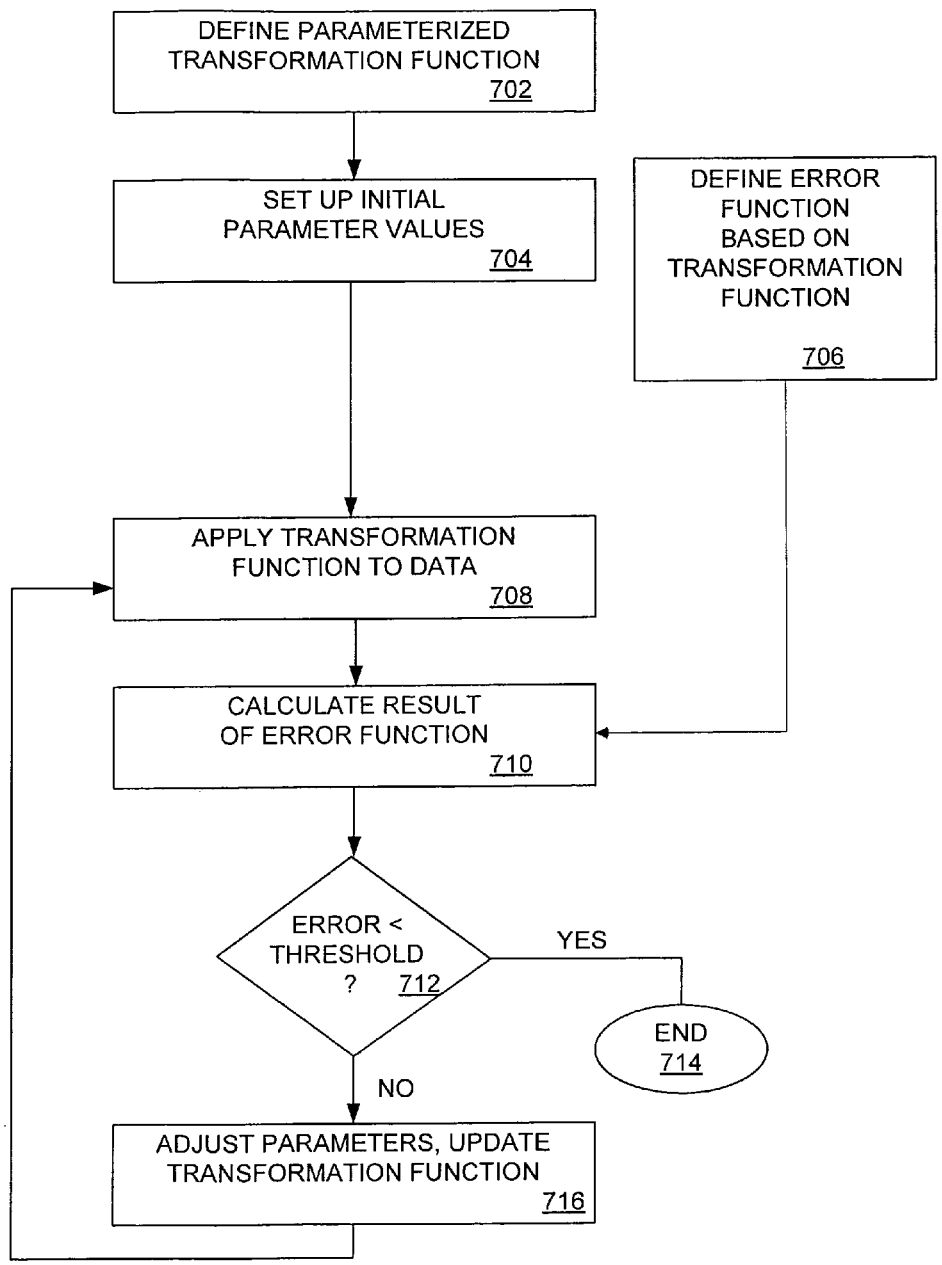
FIG. 7 is a flowchart illustrating one embodiment of the methodology of determining the transformation function of the methodology of FIG. 6.
Figure 8:
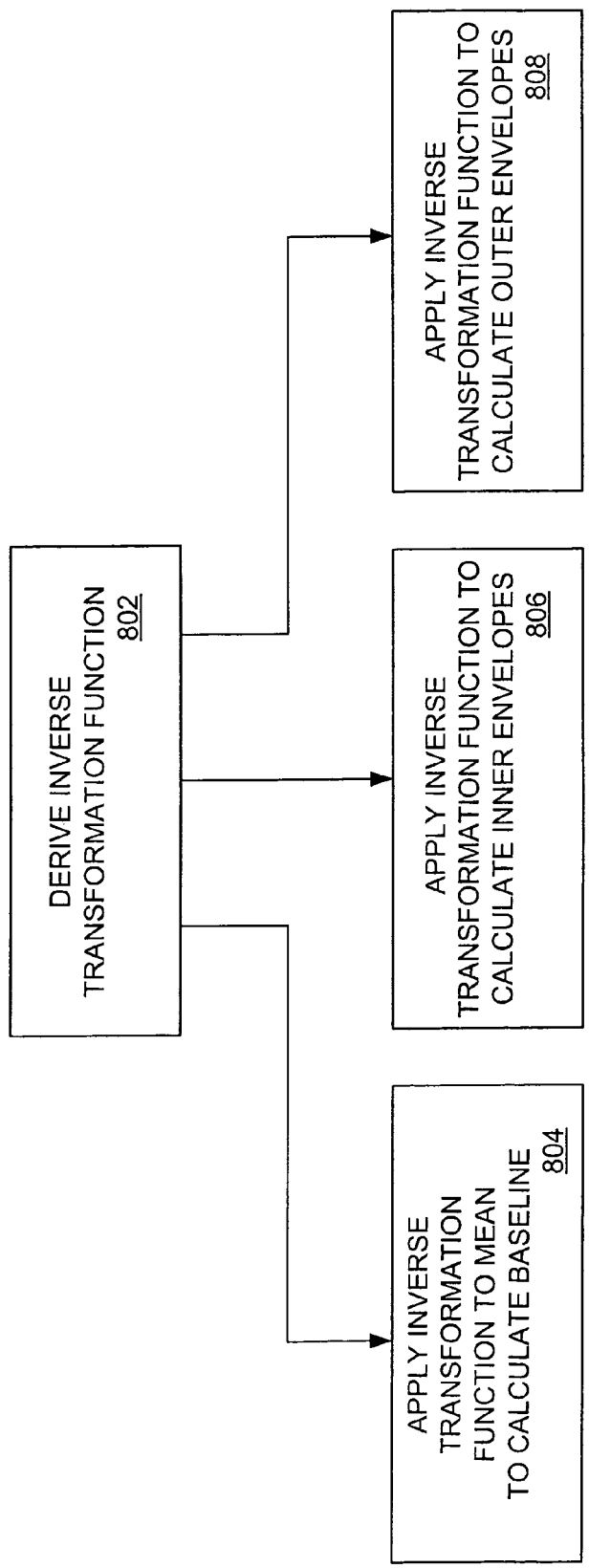
FIG. 8 is a flowchart illustrating one embodiment of the methodology of deriving the inverse transformation function and applying it to generate a baseline and the corresponding bands of the methodology of FIG. 6.
Figure 9:
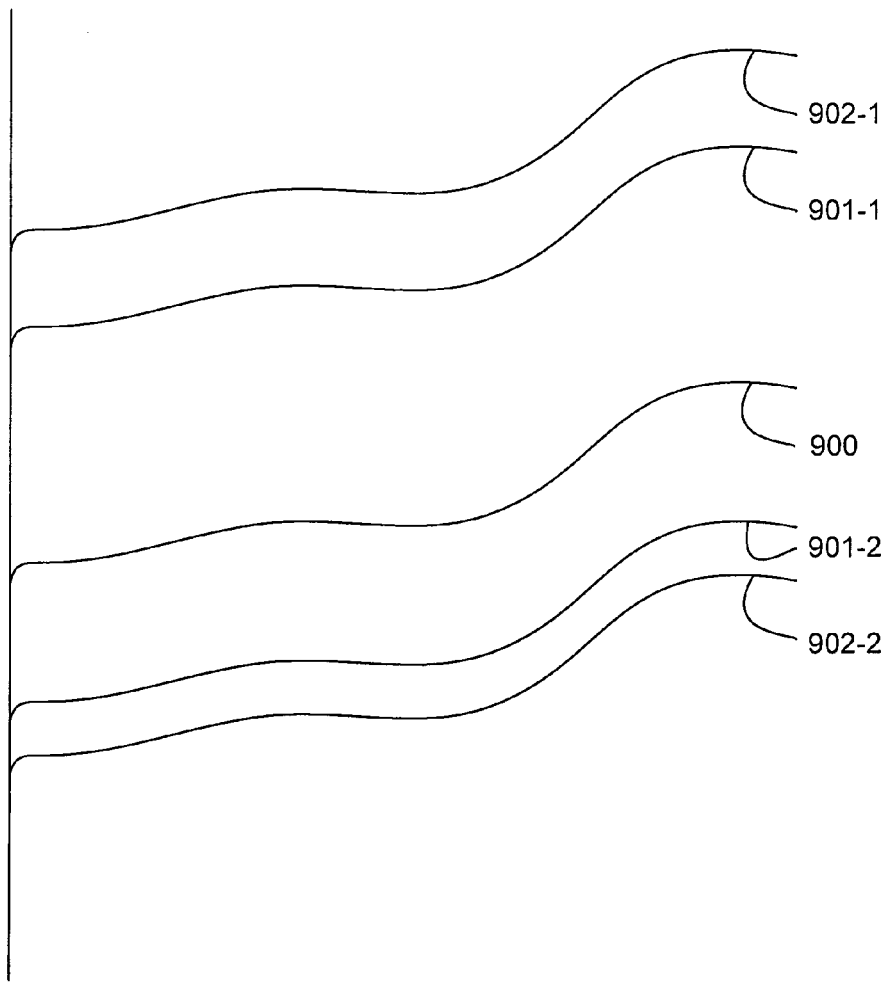
FIG. 9 is a diagram illustrating data of baseline and bands calculated by the analysis engine of FIG. 1.

FIGS. 7-9 illustrate portions of the methodology of FIG. 6.

FIG. 7 is a flowchart illustrating one embodiment of the methodology of determining 602 the inverse transformation function of the methodology of FIG. 6.

The data analysis module 108 defines 702 a parameterized transformation function and sets up 704 initial parameter values. The data analysis module 108 applies 708 the transformation function to the data to form a new data distribution. The data analysis module 108 defines 706 an error function based on the transformation function. The data analysis module 108 calculates 710 the error, which is from applying the transformed data to the error function. An error function is defined to measure how close the given data is to a normal distribution. If the resultant error from the error function is not less than a predetermined threshold 712, the data analysis module 108 adjusts 716 the parameters and reformulates a new transformation function based on the results of the error function. Using the new transformation function, the data analysis module 108 applies 708 the transformation function to the data and proceeds as described above until a transform function forms a substantially normal distributed data set. If the resultant error is less than the predetermined threshold 712, the data analysis module 108 has completed 714 the transformation of the data and procedures as described above in FIG. 7.

FIG. 8 is a flowchart illustrating one embodiment of the derive 612 the inverse transformation function and inversely transform 614 the mean and envelopes in FIG. 6. FIG. 9 is a diagram illustrating baseline data and the corresponding bands calculated by the data analysis module 108.

The data analysis module 108 derives 802 the inverse transformation function for transforming 804/806/808 the data back into the original data space. The data analysis module 108 applies 804 the inverse transformation function to the mean calculated 608 in FIG. 6 to calculate an inverse-transformed mean as a baseline value for the cluster data set. This calculation of the mean is repeated for each cluster data set and then graphed to form a line 900. The data analysis module 108 applies 806 the inverse transformation function to the inner envelope calculated 610 in FIG. 6 to calculate inverse-transformed inner envelopes for the data set. The inner envelopes are shown as lines 901-1 and 901-2 and define the area between lines 901-1 and 901-2 as an inner band. In one embodiment, any actual data located inside the band may be considered normal. The data analysis module 108 applies the inverse transformation function 808 to the outer envelopes calculated 610 in FIG. 6 to calculate inverse-transformed outer envelopes for the data set. The outer envelopes shown as lines 902-1 and 902-2 define the two areas between inner and outer boundary as outer bands. In one embodiment, any data located inside the bands may be a warning or an alert, and outside the inner and outer bands may be a violation or an alarm.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating a baseline using a dynamic window for grouping data through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

Embodiments of the invention may also include a computer program product for use in conjunction with a computer system, the computer program product comprising a computer readable storage medium and a computer program mechanism embedded therein.

What is claimed is:

1. A method executed on a computer including at least one processor for establishing a baseline of network traffic data, the method comprising:
   generating a configurable static window for grouping said network traffic data;
   extracting, grouping and ordering said network traffic data based on the configurable static window;
   generating a dynamic window for clustering said groups of network traffic data based on statistical similarity of groups;
   clustering said groups of network traffic data based on the dynamic window;
   determining a transformation function from historical network traffic data using feedback control, the transformation function making a data set having a normal distribution or a nearly normal distribution;
   generating transformed network traffic data associated with a distribution having the normal distribution or having the nearly normal distribution by applying the transformation function to said network traffic data within a cluster to map the network traffic data within the cluster into the data set having the normal distribution or having a nearly normal distribution;
   calculating an error indicating a similarity between the distribution associated with the transformed network traffic data and the normal distribution, and responsive to the error equaling or exceeding a threshold, modifying the transformation function to modify the distribution associated with the transformed network traffic data to reduce the error; and
   generating a baseline of network traffic data for each cluster from the transformed network traffic data.

2. The method of claim 1 further comprising caching the groups of network traffic data in a defined data structure.

3. The method of claim 1 further comprising generating corresponding bands of network traffic data for each cluster.

4. The method of claim 3 wherein generating a baseline and the corresponding bands includes:
   calculating a mean and standard deviation of the transformed network traffic data;
   calculating envelopes using the mean and the standard deviation;
   deriving the inverse transformation function based on the transformation function;
   inversely transforming the mean and the envelopes using the inverse transformation function;
   defining the inversely transformed mean as a baseline;
   generating alarms responsive to the inversely transformed envelopes.

5. The method of claim 1, wherein the clustering of groups of network traffic data comprises:
   calculating gradients between ordered groups based on centroids of the groups;
   determining number of clusters of groups and initial clusters based on the distribution of the gradients;
   marking the clusters as being in a first set;
   calculating the centroids of the clusters in the first set;
   clustering groups to form a second set of clusters based on distances to the centroids;
   comparing the clusters in the second set with the clusters in the first set.

6. The method of claim 5 further comprising:
   repeating the marking, calculating, clustering and comparing the clusters until the clusters after marking, calculating and clustering are the same as the clusters before marking, calculating and clustering.

7. The method of claim 4 wherein the calculating envelopes using the mean and the standard deviation includes calculating envelopes based on multipliers of the standard deviation from the mean.

8. The method of claim 7 wherein the multipliers are between 2.0 and 4.0 standard deviations.

9. The method of claim 7 wherein the multipliers are configurable by a user.

10. The method of claim 4 further comprising removing outlier network traffic data after the data transformation.

11. The method of claim 10 wherein the removing outlier network traffic data includes:
    calculating the mean and standard deviation of a given data set;

determining the outlier that is the furthest datum and statistically far away from its closest neighbor and from the mean value;
discarding the outlier and forming a new set of data;
repeating the calculating, determining and discarding until no more outliers are detected.

12. The method of claim 4 wherein calculating the error indicating the similarity between the distribution associated with the transformed network traffic data and the normal distribution, and responsive to the error equaling or exceeding a threshold, modifying the transformation function to modify the distribution associated with the transformed network traffic data to reduce the error includes:
   defining a parameterized transformation function;
   setting initial parameter values;
   applying the parameterized transformation function to the network traffic data;
   calculating a result of an error function based on the transformed network traffic data and the desired values;
   determining if the result of the error function error is below the threshold;
   adjusting the parameters according to the result of the error function to update the parameterized transformation function;
   repeating the applying, calculating, determining and adjusting until the result of the error function is below the threshold.

13. A computer program product for use in conjunction with a computer system, the computer program product comprising a non-transitory computer readable storage medium including a computer program mechanism executable by a processor embedded therein, the computer program mechanism including:
   instructions for generating a configurable static window for grouping network traffic data;
   instructions for extracting, grouping and ordering said network traffic data based on the configurable static window;
   instructions for generating a dynamic window for clustering said groups of network traffic data based on statistical similarity of groups;
   instructions for clustering said groups of network traffic data based on the dynamic window;
   instructions for determining a transformation function from historical network traffic data using feedback control, the transformation function making a data set having a normal distribution or a nearly normal distribution;
   instructions for generating transformed network traffic data associated with a distribution having the normal or having the nearly normal distribution by applying the transformation function to said network traffic data within a cluster to map the network traffic data within the cluster to the data set having the normal distribution or having the nearly normal distribution;
   instructions for calculating an error indicating a similarity between the distribution associated with the transformed network traffic data and the normal distribution, and responsive to the error equaling or exceeding a threshold, modifying the transformation function to modify the distribution associated with the transformed network traffic data to reduce the error; and
   instructions for generating a baseline of network traffic data for each cluster from the transformed network traffic data.

14. The computer program product of claim 13 wherein instructions for generating a baseline includes:
   instructions for calculating a mean and standard deviation of the transformed network traffic data;
   instructions for calculating envelopes using the mean and the standard deviation;
   instructions for deriving the inverse transformation function based on the transformation function;
   instructions for inversely transforming the mean and the envelopes using the inverse transformation function;
   instructions for defining the inversely transformed mean as a baseline;
   instructions for generating alarms responsive to the inversely transformed envelopes.

15. The computer program product of claim 13, wherein the instructions for clustering of groups of network traffic data comprises:
   instructions for calculating gradients between ordered groups based on centroids of the groups;
   instructions for determining number of clusters of groups and initial clusters based on the distribution of the gradients;
   instructions for marking the clusters as being in a first set;
   instructions for calculating the centroids of the clusters in the first set;
   instructions for clustering groups to form a second set of clusters based on distances to the centroids;
   instructions for comparing the clusters in the second set with the clusters in the first set.

16. The computer program product of claim 15 further comprising:
   instructions for repeating the marking, calculating, clustering and comparing the clusters until the clusters after marking, calculating and clustering are the same as the clusters before marking, calculating and clustering.

17. The computer program product of claim 14 wherein instructions for removing outlier data after the data transformation.

18. The computer program product of claim 17 wherein the instructions for removing outlier data comprises:
   instructions for calculating the mean and standard deviation of a given data set;
   instructions for determining the outlier that is the furthest datum and statistically far away from its closest neighbor and from the mean value;
   instructions for discarding the outlier and forming a new set of data;
   instructions for repeating the calculating, determining and discarding until no more outliers are detected.

19. The computer program product of claim 14 wherein instructions for calculating an error indicating a similarity between the distribution associated with the transformed network traffic data and the normal distribution, and responsive to the error equaling or exceeding a threshold, modifying the transformation function to modify the distribution associated with the transformed network traffic data to reduce the error include:
   instructions for defining a parameterized transformation function;
   instructions for setting initial parameter values;
   instructions for applying the parameterized transformation function to the network traffic data;
   instructions for calculating a result of an error function based on the transformed network traffic data and the desired values;
   instructions for determining if the result of the error function is below the threshold;

instructions for adjusting the parameters according to the result of the error function to update the parameterized transformation function;

instructions for repeating the applying, calculating, checking and adjusting until the result of the error function is below the threshold.

20. A system comprising:

a processor for executing programs;

a module executable by the processor, the module including:

instructions for generating a configurable static window for grouping network traffic data;

instructions for extracting, grouping and ordering said network traffic data based on the configurable static window;

instructions for generating a dynamic window for clustering said groups of network traffic data based on statistical similarity of groups;

instructions for clustering said groups of network traffic data based on the dynamic window;

instructions for determining a transformation function from historical network traffic data using feedback control, the transformation function making a data set having a normal distribution or a nearly normal distribution;

instructions for generating transformed network traffic data associated with a distribution having the normal distribution or having the nearly normal distribution by applying the transformation function to said network traffic data within a cluster to map the network traffic data within the cluster into the data set having the normal distribution or having the nearly normal distribution;

instructions for calculating an error indicating a similarity between the distribution associated with the transformed network traffic data and the normal distribution, and responsive to the error equaling or exceeding a threshold, modifying the transformation function to modify the distribution associated with the transformed network traffic data to reduce the error; and instructions for generating a baseline of network traffic data for each cluster from the transformed network traffic data.

21. The system of claim 20 wherein instructions for generating a baseline includes:

instructions for calculating a mean and standard deviation of the transformed network traffic data;

instructions for calculating envelopes using the mean and the standard deviation;

instructions for deriving the inverse transformation function based on the transformation function;

instructions for inversely transforming the mean and the envelopes using the inverse transformation function;

instructions for defining the inversely transformed mean as a baseline;

instructions for generating alarms responsive to the inversely transformed envelopes.

22. The system of claim 20, wherein the instructions for clustering of groups of network traffic data comprises:

instructions for calculating gradients between ordered groups based on centroids of the groups;

instructions for determining number of clusters of groups and initial clusters based on the distribution of the gradients;

instructions for marking the clusters as being in a first set;

instructions for calculating the centroids of the clusters in the first set;

instructions for clustering groups to form a second set of clusters based on distances to the centroids;

instructions for comparing the clusters in the second set with the clusters in the first set.

23. The system of claim 22 further comprising:

instructions for repeating the marking, calculating, clustering and comparing the clusters until the clusters after marking, calculating and clustering are the same as the clusters before marking, calculating and clustering.

24. The system of claim 21 wherein instructions for removing outlier data after the data transformation.

* * * * *